April 15, 1941.  P. B. PARKS ET AL  2,238,369
THERMOSTATIC VAPOR REGULATOR
Filed Aug. 3, 1939   2 Sheets-Sheet 1
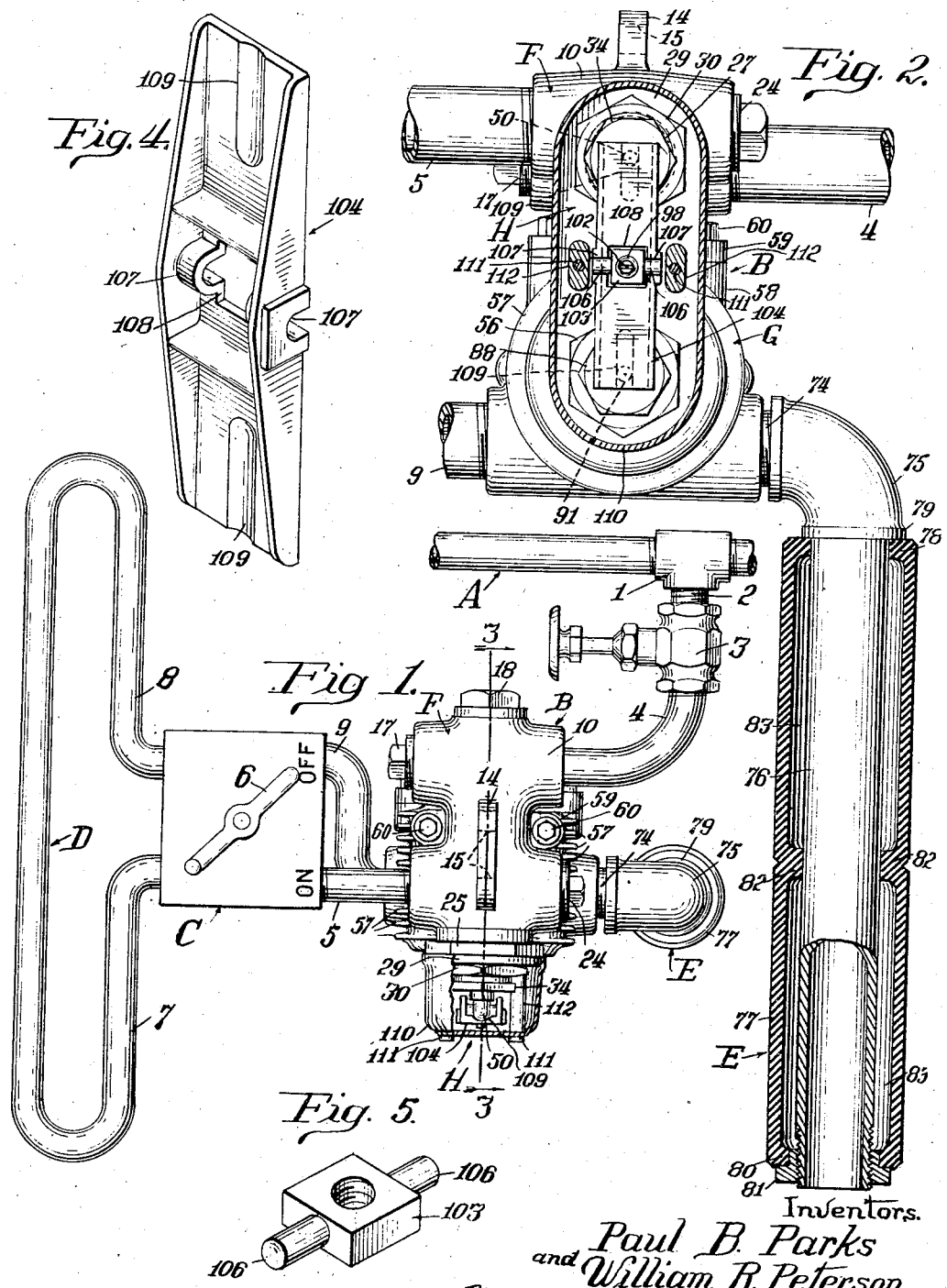
Inventors.
Paul B. Parks
and William R. Peterson April 15, 1941.  P. B. PARKS ET AL  2,238,369
THERMOSTATIC VAPOR REGULATOR
Filed Aug. 3, 1939   2 Sheets-Sheet 2

Inventors.
Paul B. Parks
and William R. Peterson
By Barrett & Truman
Attorneys.

Patented Apr. 15, 1941

2,238,369

UNITED STATES PATENT OFFICE 2,238,369

THERMOSTATIC VAPOR REGULATOR

Paul B. Parks, Oak Park, and William R. Peterson, Chicago, Ill., assignors to Vapor Car Heating Company, Inc., Chicago, Ill., a corporation of New York Application August 3, 1939, Serial No. 288,104

9 Claims. (Cl. 236—40)

This invention relates to certain new and useful improvements in a thermostatic vapor regulator, that is, a device for automatically controlling the flow of steam into a radiating or other heat-exchange system so that the system will be kept filled with low pressure steam, the steam being taken from a source of steam at higher pressure.

Such a control device normally utilizes a valve positioned between the source of steam and the radiating system, the movement of this valve toward or from closed position being regulated by a thermostatic device that is exposed to the fluids returned from the radiating or heat-exchange system, such fluids comprising a mixture of steam, condensate, and non-condensable gases. When the thermostatic device is enveloped by steam or subjected to substantially steam temperature it will move or expand so as to (through intermediate connections) close the valve. When the thermostatic member is exposed to a considerably lower temperature it will move in the opposite direction or contract so as to open the valve and admit more steam to the system. The present improved device is of this general type but embodies a number of improvements which will hereinafter be discussed in detail. Especially, a highly sensitive thermostatic bellows is used, this thermostatic device functioning within the narrow range of temperatures between the temperature of steam and the temperature of condensate. That is, the thermostatic bellows will expand when exposed to steam, but will contract when engaged by condensate at a rather high temperature, although a somewhat lower temperature than that of steam. The connections between the thermostatic member and the valve are so arranged as to facilitate the opening of the valve when more steam is needed in the radiating system.

The principal object of this invention is to provide an improved vapor regulator of the type disclosed in detail in the specifications which follow.

Another object is to provide a vapor regulator that is smaller and more compact than devices of this kind heretofore in use.

Another object is to provide a vapor regulator in which the valve assembly and the regulating assembly are separated so as to prevent, as far as practicable, the radiation or conduction of heat from the steam-containing valve assembly through the regulating or control assembly including the thermostat.

Another object is to provide a vapor regulator including a regulating or thermostatic assembly designed to radiate heat rapidly so that the thermostatic member can quickly follow temperature changes.

Another object is to provide means for causing the returned condensate to be distributed over and wash against the thermostatic member so as to rapidly contract the thermostat.

Another object is to provide an improved thermostatic bellows.

Another object is to provide means for holding the thermostatic bellows in proper alignment at both ends while permitting a portion of this bellows to move longitudinally.

Another object is to provide a self-contained and self-aligning valve assembly.

Another object is to provide improved means for sealing the passages leading from the fluid chambers through which the operating rods project.

Another object is to provide an improved self-aligning bridging member or lever for transferring movement of one operating rod to the other.

Other objects and advantages of this invention will be more apparent from the following detailed description of one approved form of apparatus constructed and operating according to the principles of this invention.

In the accompanying drawings:

Fig. 1 is an assembly showing the vapor regulator in top or plan view, together with the piping connections between the regulator and the source of supply and radiating system.

Fig. 2 is an end elevation of the vapor regulator with the end cover member in section substantially on the line 2—2 of Fig. 3.

Fig. 4 is a perspective view of the improved bridging lever.

Fig. 5 is a perspective view of the fulcrum member on which the lever is pivoted.

Figure 3:
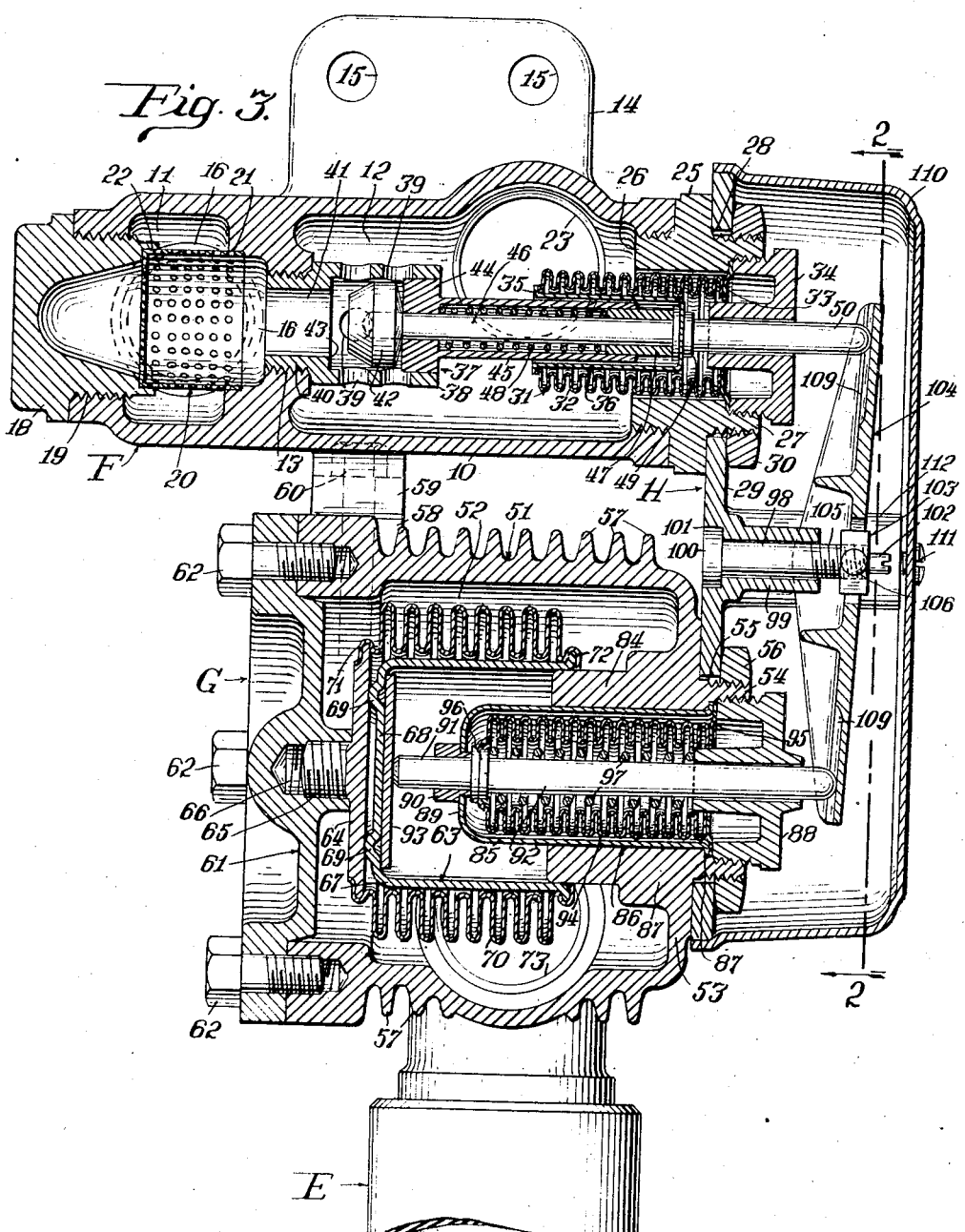
Fig. 3 is a central vertical longitudinal section through the vapor regulator, the view being taken substantially on the line 3—3 of Fig. 1.

Reference will first be made more particularly to Fig. 1 which indicates more or less diagrammatically a typical assembly in which this improved vapor regulator is used. At A is indicated the main source of steam supply. This invention relates more particularly to heating systems for railway passenger cars (although not necessarily limited to such use) and in such a system A indicates the main train pipe which runs throughout the length of the train and delivers steam from the source at the locomotive. This steam, under fairly high pressure, flows from T fitting 1 through pipe 2, valve 3 and supply pipe 4 into the vapor regulator indicated generally at B. The thermostatically controlled valve in the vapor regulator B (as hereinafter described in detail) controls the flow of steam from pipe 4 through the regulator and thence through pipe 5 to the main control valve indicated at C. This valve C may be controlled manually (as here indicated by the lever 6) although the valve will more usually be controlled automatically from a thermostat through suitable electrical connections as well known in the art. When valve C is in open position, the steam will flow from the valve through pipe 7 to and through the radiator or series of radiators indicated generally at D and thence back, along with condensate and non-condensable gases, through pipe 8 to and through valve C and thence through pipe 9 into the return chamber of the vapor regulator B. These returned fluids (steam or non-condensable gases or condensate or more usually a mixture of all three) contact with a thermostatic member (hereinafter described) in the return chamber of the vapor regulator, this thermostatic member functioning to open or close the valve which controls the flow of steam to the main distributing valve C. As soon as the radiating system or other heat-exchange system indicated generally at D has become filled with steam, steam will return so as to contact the thermostatic control member and cause the supply valve to be closed. When part of this steam has been condensed and steam no longer contacts the thermostatic member, the control valve of the vapor regulator will again open to admit more steam to the radiating system. The return chamber of the vapor regulator is open to the atmosphere through the drain connection E (hereinafter described in detail) so that the entire radiating or heat-transfer system supplied from vapor regulator B will be under very low pressure, substantially atmospheric pressure. If the original steam pressure in supply pipe A is fairly high, the valve 3 may be in the form of a reducing valve so that steam will be delivered under a much reduced pressure through pipe 4 to the vapor regulator, and thence at intervals through pipe 5 to the heat-exchange system. Since this system is open at its discharge end to the atmosphere through drain connection E the pressure will never greatly exceed atmospheric in the heat transfer system D.

When the temperature in the car or other space being heated has been raised to the desired point, valve C will be moved to "off" or closed position so that the radiating loop D will be cut off from the source of supply and the steam will be delivered from pipe 5, through a portion of valve C direct to pipe 9 and thence back to the vapor regulator. The action of the vapor regulator is always the same—to keep the radiating loop full of low pressure steam—whether this loop is short, including only pipes 5, 9 and the valve C, or larger including also the radiating system D.

The improved vapor regulator B, which forms the particular subject matter of this invention, will now be described more in detail, referring now to the other figures of the drawings as well as Fig. 1. The vapor regulator comprises a valve portion indicated generally at F, a regulating or thermostatic portion indicated generally at G, and a connecting and supporting portion H. The valve portion F comprises the main casting 10 formed internally with an inlet chamber 11 and a larger feed chamber 12 connected by the internally threaded passage 13. An upwardly extending lug or bracket member 14 is provided with bolt-receiving openings 15 and serves to support the vapor regulator from some adjacent fixed structure.

A pair of similar inlet port openings 16 extend through the opposite sides of housing 10 into the inlet chamber 11, the supply pipe 4 being connected into one of these openings and the opposite opening being closed by a screw plug 17 (Figs. 1 and 2). The outer end of chamber 11 is closed by a screw plug 18 threaded into the opening 19 in casing 10. This plug 18 serves to hold in place the strainer 20 which fits at its opposite ends in shouldered recesses 21 and 22 in the casting 10 and plug 18 respectively. The steam entering chamber 11 through port 16 must pass through strainer 20 in order to reach the passage 13 leading to feed chamber 12.

The pipe 5 leading from feed chamber 12 to the distributing valve C is fitted in one of a pair of oppositely disposed ports 23 leading into opposite sides of feed-chamber 12, the other of these ports being closed by a screw plug 24 (Figs. 1 and 2). The open end of feed chamber 12, opposite the inlet passage 13 leading from chamber 11, is partially closed by an annular member 25 having a nipple 26 threaded into the opening in casting 10. The threaded nipple 27 at the opposite end of member 25 extends freely through an opening 28 in the supporting plate 29 forming a portion of the connecting assembly H. A nut 30 is threaded on the outer portion of nipple 27 so as to clamp this end of the valve assembly F to the supporting plate 29. This end of feed chamber 12 is finally completely closed by the sealing means indicated generally at 31 and comprising the corrugated flexible bellows diaphragm 32 which is permanently welded or soldered at its outer end to the ring or washer 33 anchored in place in annular member 25 by the threaded plug 34. The opposite end of bellows 32 is secured to the collar or flange 35 at the open end of thimble 36 enclosed within the expansible diaphragm 32. It will now be apparent that while thimble 36 can move freely along its central longitudinal axis, the end wall of chamber 12 will remain sealed at all times.

The unitary self-aligning valve unit indicated generally at 37 is housed and supported within the feed-chamber 12. This unit comprises a cage structure 38 provided with a plurality of steam passages 39 in its side walls and having at one end a hollow neck portion 40 which is threaded into the passage 13 so as to support this end of the valve unit, the passage 41 through neck 40 serving to conduct steam from chamber 11 into chamber 12. The movable valve member 42 housed within cage 38 is adapted to cooperate with the valve seat 43 at the outlet end of passage 41 in order to stop or control the flow of steam from chamber 11 into chamber 12. The other end of cage 38 is closed by an end wall 44 from which the guide tube 45 extends into the sealing thimble 36. The valve stem 46 extends from valve 42 through a guide passage in end wall 44 of the cage and terminates in a head 47 slidable in guide tube 45. In this way the valve stem is guided near each end thereof so as to keep the valve head 42 in proper alignment with the valve seat 43. A spring 48 surrounding stem 46 is confined between the end wall 44 of the cage and head 47, this spring tending to move the valve member 42 away from its seat 43, that is, open the valve. The head 47 at the end of stem 46 bears against the inner surface of the end wall of thimble 36, while the head 49 at the inner end of a plunger or operating rod 50 bears against the outer surface of the end of the thimble so that the stem 46 and plunger 50 form substantially continuations of one another. The plunger 50 is guided through a passage in the closure plug 34.

The valve will be closed by an inward pressure on plunger or rod 50, this pressure being transmitted from the thermostatic bellows through the connections hereinafter described. It will be apparent that the higher pressure existing in chamber 11 is always exerted on the head of the movable valve member 42 in a direction tending to open the valve. The spring 48 also is always tending to move the valve to open position. Furthermore, as soon as the valve 42 is slightly opened, the steam admitted to chamber 12 will increase the pressure in this chamber, this pressure being exerted against the sealing bellows 32 in a direction to contract or compress the same and push the plunger 50 outwardly. This tends to compress the thermostatic bellows (hereinafter described) and decrease the opposition to spring 48 which will quickly move valve 42 to open position.

The thermostatic regulating assembly indicated generally at G comprises the main casting 51 enclosing the return chamber 52. Chamber 52 is partially closed at one end by end wall 53 from which the externally threaded annular nipple 54 projects through an opening 55 in supporting plate 29 to receive the nut 56 so that the assembly G is supported from plate 29 in much the same manner as assembly F already described. The openings 28 and 55 in plate 29 are so spaced apart that the housing 51 will be spaced from the housing 10, the longitudinal central axes of the two housings being substantially horizontal and parallel to one another. The peripheral surface of housing 51 is provided with a series of ribs 57 so that heat will be radiated rapidly to permit the thermostatic member hereinafter described to respond quickly to temperature changes in chamber 52.

While the two assemblies F and G are supported at one end, in spaced apart relation, by the plate 29, the other end portions of the assemblies are spaced apart and assembly G is partially supported from assembly F by the upwardly projecting lugs 58 on housing 51 which are attached to the downwardly projecting lugs 59 on housing 10 by bolts 60. Except for the connections noted, the housings 10 and 51 are separated as much as possible to minimize the transmission of heat by radiation or conduction from one to the other and to permit the quick dissipation of heat from the regulating housing 51.

The opposite end of housing 51, that is the end remote from supporting plate 29, is closed by the removable cover plate 61 removably secured to main casting 51 by a plurality of screw bolts 62.

The improved thermostatic bellows member indicated generally at 63 is closed at one end by a plate 64 having a projecting stud 65 which is threaded into a socket 66 formed centrally in closure plate 61. The thermostatic member also comprises a cup member 67, the bottom 68 of which is formed with an outwardly projecting annular rib 69 adapted to engage the end plate 64 when the thermostatic member is contracted or collapsed. The outer flexible wall of the thermostatic member is formed by a corrugated metallic bellows member 70 secured at one end to the peripheral rib 71 on plate 64 and at the other end to the outstanding flange 72 at the open end of cup 67. The space within this assembly contains a quantity of a suitable heat sensitive fluid so selected that the fluid will expand and exert considerable outward thrust on the movable portion 67 of the thermostatic member when the bellows is exposed to steam temperature, that is when a considerable quantity of steam is admitted to chamber 52. On the other hand, if the temperature falls appreciably in this chamber, for example if the bellows 70 is exposed to the slightly lower temperature of condensate returned from the heat-transfer system, the fluid in the thermostatic member will contract and the thermostatic member will be compressed to the position shown in the drawings. This thermostatic member is quite sensitive so that it will operate within the narrow temperature range between the temperature of steam and the temperature of the condensate returned to the vapor-regulator. In vapor-regulators as heretofore known, it has usually required a much lower temperature than that of condensate to cause the thermostatic member to contract, and consequently the condensate is usually shunted away from the thermostatic member so as to permit the colder air or non-condensable gases to freely contact this member.

A pair of aligned ports 73 are formed in the opposite sides of the lower portion of housing 51. The pipe 9 through which fluids are returned from the radiating system and control valve C is fitted into one of these ports 73, while the outlet pipe 74 is fitted into the opposite port 73, this pipe 74 connecting through fitting 75 with the upper end of the drain assembly E as hereinafter described. It will thus be seen that condensate returned from the radiating system will be distributed over and wash against the lower portion of bellows 70 so as to quickly collapse the bellows. On the other hand, when steam is returned through pipe 9 this steam will quickly fill the chamber 52 and cause the bellows to expand.

The condensate and non-condensable gases will eventually flow out through the pipe connections 74 and 75, and the vertically disposed drain pipe 76 (of assembly E) which is open to the atmosphere at its lower end. Since the present improved vapor-regulator B is substantially shorter and more compact than those heretofore in use, it is desirable to extend the drain connection downwardly, particularly when mounted beneath a railway car, and this is one of the reasons that drain pipe 76 is used. Also, since all of this vapor-regulator assembly is exposed to the air when mounted beneath a railway car the problem of freezing in cold weather will arise. For this reason the drip opening is spaced downwardly away from the regulator chamber 52, and the drain pipe 76 is enclosed by a jacket 77 of insulating material. This insulating jacket is formed with an upper inwardly directed annular collar 78 which is fitted about pipe 76 beneath the outstanding collar 79 on fitting 75. A similar inwardly directed collar or flange 80 at the lower end of the insulating jacket is held in place by the gland or nut 81 threaded on the lower end portion of drain pipe 76. An intermediate inwardly extending collar 82 engages about pipe 76 so as to space the central portion of the jacket from the pipe. As a consequence definite air spaces 83 are formed between the insulating jacket and the pipe, these air spaces adding to the insulating properties of jacket 77 so as to minimize the heat loss from drain pipe 76. As a consequence the temperature within this drain assembly E will remain sufficiently high so that condensate will not freeze therein.

A rather large annular guide stud 84 projects inwardly from end wall 53 of housing 51 and fits slidably within the open end of cup 67 of the thermostat. This serves to support the movable end portion of the thermostatic bellows so that the bellows is suitably supported and kept in alignment at both ends.

The metallic thimble or shield 85 is fitted within the central opening 86 in guide stud 84, the outer end of this thimble having an outturned flange or collar 87 which is clamped in place against end wall 53 by the threaded plug 88 screwed into nipple 54. The inturned inner end 89 of shield 85 supports a slide bearing 90 through which moves the inner end 91 of the plunger or operating rod 92, the outer end portion of which projects slidably through a central opening in the closure plate 88. The inner end of this operating rod engages the inner bottom surface of cup 67, or a reinforcing plate 93 mounted within the cup. The outer end of plunger 92 is adapted to transmit movement from the expanding bellows to the valve assembly, as hereinafter described. A corrugated metallic sealing bellows 94 is housed within and protected by the shield 85, the outer end 95 of the bellows being clamped in position in end wall 53 of housing 51 by the closure plug 88 already described. The inner end of bellows 94 is secured to a collar 96 on operating rod 92. A compression spring 97 surrounding plunger 92 and confined between collar 96 and the end of plug 88 tends to compress or collapse the thermostatic member 63. When this thermostatic member is subjected to a steam temperature, it will expand so as to move the cup 67 to the right (Fig. 3) thereby pushing the plunger or operating rod 92 outwardly against the resistance of spring 97. The movable end of the sealing bellows 94 will move with the operating rod 92 and will prevent the escape of steam or other fluids at this end of the housing 51 at all times.

The connecting assembly H comprises, in addition to the supporting plate 29 already referred to, a bolt or post 98 which is rotatably journaled in the stud or post 99 projecting outwardly from the central portion of plate 29 so that bolt 98 will extend substantially parallel to the outwardly projecting portions or plungers 50 and 92. The head 100 at the inner end of bolt 98 is housed within a socket 101 in plate 29 so as to prevent outward movement of the bolt or post beyond the position shown in Fig. 3. The outer end of bolt 98 is provided with the slotted head 102 so that the post can be rotated by a screw driver or similar instrument.

This post 98 adjustably carries the pivot member 103 (see Fig. 5) for the bridging lever 104 (see Fig. 4). The pivot member 103 comprises a central nut portion which is internally threaded onto the threaded portion 105 of post 98. Cylindrical trunnions 106 project from opposite sides of nut 103 and engage slidably and rotatably in the aligned sockets 107 formed in the outer side of the central portion of lever 104 (Fig. 4). This lever is formed with a central opening 108 from which the semi-cylindrical recesses 107 extend, and opening 108 is of greater size than nut 103 so that the lever can adjust itself laterally by sliding along the projecting trunnions 106 in either direction. The inner faces of the oppositely extending arms of the lever are formed with longitudinally extending slots or recesses 109 in which the outwardly projecting ends of the respective plungers 50 and 92 engage. It will now be apparent that the lever 104 may adjust itself laterally so as to properly align itself with these plungers, this self-adjustment being assisted by a possible rotary movement around the axis of bolt 98. The rounded outer end portions of the plungers are also adapted to adjust their positions within the rounded slots 109.

It will now be apparent that with the valve 42 in completely open position and the thermostat 63 in completely collapsed position as shown in the drawings, or vice versa, the bridging lever 104 can be properly adjusted to engage snugly with the outwardly projecting ends of plungers 50 and 92 by simply rotating the bolt 98 so as to move the pivot member 103 inwardly or outwardly with respect to supporting plate 29.

This whole connecting assembly H is enclosed by a hood or cover 110 fitted about the periphery of plate 29 and secured by screws 111 to a pair of posts 112 projecting outwardly from supporting plate 29.

This entire regulator has been designed to increase the sensitiveness of the apparatus so that a temperature of substantially 212° can be maintained continuously throughout the heat-transfer system. It will be noted that all of the forces exerted on movable valve 42 tend to move the valve to open position, with the single exception of the inward force applied to plunger 50 when the thermostatic member 63 is expanded by the presence of a considerable proportion of steam in return chamber 52. At this time plunger 92 will be forced outwardly and through lever 104 will force plunger 50 inwardly so as to close the valve 42. This movement is resisted by both springs 97 and 48, as well as the higher pressure steam in chambers 11 and 12. As soon as the steam in chamber 52 has condensed the thermostatic member 63 will commence to contract, this movement being expedited by the condensate which is returned into contact with bellows 70. This collapsing movement is assisted by spring 97. When the inward pressure on plunger 50 is thus relieved or eliminated, the spring 48 will at once start to open valve 42, this movement being assisted by the higher steam pressure through passage 41 acting on the head of the valve, and this will immediately be increased by the higher pressure developed in feed chamber 12 and acting on the sealing bellows 32. As a consequence the valve will be opened very promptly immediately after steam temperature has been withdrawn from return chamber 52. The rapid lowering of the temperature in this chamber 52 as soon as the flow of steam into this chamber ceases will be facilitated by the rapid dissipation of heat from the finned housing 51, and also by the condensate which is delivered into direct contact with the thermostatic bellows. As a consequence, steam will be delivered into the radiating or heat-exchange system much more promptly than has heretofore been the case, and this flow of steam will continue until sufficient steam has returned into the chamber 52 to cause the thermostatic member to expand. As a consequence the radiating system will be kept substantially full of steam at a temperature of 212° at all times that control valve C is open.

With vapor-regulators in use in the past it has not been possible to control a steam coil located in an air delivery duct because of the slowness or lag in feeding steam to the radiator due to the inability of these regulators to respond rapidly enough to the demand of the thermostat controlling the distributing valve C. This lag or delay in feeding steam to the coil causes the controlling room or duct thermostat to be unduly chilled, with the final result that there will be an unduly prolonged delivery of steam to the radiating coil resulting in "over-shooting" or excessive room temperature. The present improved vapor-regulator is so sensitive that this "over-shooting" is no longer apparent and a substantially constant duct and room temperature can be maintained. While this improved vapor-regulator has been designed especially for use in controlling the heating system on a railway car, it is apparent that it may be used in other heating or heat-transfer systems operating with steam at substantially atmospheric pressure.

We claim:

1. In a vapor regulator, a valve housing, a valve assembly therein, a thermostat housing, a thermostat assembly therein, the valve assembly and the thermostat assembly each comprising a reciprocable operating rod projecting from an end of the respective housing, a supporting plate to which the aforesaid end portions of the respective housings are secured with the operating rods projecting substantially parallel to one another at one side of the plate, and the housings being spaced apart at the other side of the plate, an intermediately pivoted operating lever the oppositely extending arms of which are longitudinally recessed on the inner face to receive the ends of the respective rods, the lever having a central opening and aligned pivot channels in the outer face of the lever portions at the sides of the opening, a bolt rotatably mounted in the plate and extending parallel to and between the rods and having a threaded outer portion, and a pivot-member comprising a central portion threaded on the bolt and positioned loosely in the lever opening and pins extending laterally from the central portion and fitting slidably and rotatably in the pivot channels of the lever.

2. In a vapor regulator, a valve housing containing an inlet chamber, a feed chamber and a port connecting the chambers, a valve assembly positioned within the feed chamber and comprising a valve adapted to close the port and means for operating the valve including a plunger projecting through one end of the housing and movable along the central longitudinal axis of the valve, a thermostat housing enclosing a thermostat chamber, a thermostatic bellows in this chamber and fixedly supported at one end by one end of the housing, the other end of the bellows being movable along a central longitudinal axis as the bellows expands or contracts, means at the other end of the housing for guiding the movable end of the bellows, a plunger projecting from the last-mentioned end of the housing and movable by the bellows along the central axis, a supporting plate in which the ends of the two housings from which the plungers project are mounted, with the two central axes parallel but the housings spaced apart at one side of the plate and the plungers projecting parallel to one another at the other side of the plate, an intermediately pivoted operating lever the oppositely extending arms of which are respectively engaged by the plungers, and a fulcrum-support for the lever extending from the plate.

3. In a vapor regulator, a valve housing containing an inlet chamber, a feed chamber and a port connecting the chambers, a valve assembly positioned within the feed chamber and comprising a valve adapted to close the port and means for operating the valve including a plunger projecting through one end of the housing and movable along the central longitudinal axis of the valve, a thermostat housing enclosing a thermostat chamber, a thermostatic bellows in this chamber and fixedly supported at one end by one end of the housing, the other end of the bellows being movable along a central longitudinal axis as the bellows expands or contracts, means at the other end of the housing for guiding the movable end of the bellows, a plunger projecting from the last-mentioned end of the housing and movable by the bellows along the central axis, a supporting plate in which the ends of the two housings from which the plungers project are mounted, with the two central axes parallel but the housings spaced apart at one side of the plate and the plungers projecting parallel to one another at the other side of the plate, an intermediately pivoted operating lever the oppositely extending arms of which are respectively engaged by the plungers, and a fulcrum-support for the lever mounted on and adjustable toward and from the plate.

4. In a vapor regulator, a valve housing containing an inlet chamber, a feed chamber and a port connecting the chambers, a valve assembly positioned within the feed chamber and comprising a valve adapted to close the port and means for operating the valve including a plunger projecting through one end of the housing and movable along the central longitudinal axis of the valve, a thermostat housing enclosing a thermostat chamber, a thermostatic bellows in this chamber and fixedly supported at one end by one end of the housing, the other end of the bellows being movable along a central longitudinal axis as the bellows expands or contracts, means at the other end of the housing for guiding the movable end of the bellows, a plunger projecting from the last-mentioned end of the housing and movable by the bellows along the central axis, a supporting plate in which the ends of the two housings from which the plungers project are mounted, with the two central axes parallel but the housings spaced apart at one side of the plate and the plungers projecting parallel to one another at the other side of the plate, an intermediately pivoted operating lever the oppositely extending arms of which are respectively engaged by the plungers, a bolt rotatably mounted in the plate and extending parallel to and between the plungers and having a threaded outer end portion, and a pivot-pin for the lever centrally threaded on the rotatable bolt.

5. In a vapor regulator, in combination with a housing enclosing an inlet chamber and a feed chamber with a passage connecting the chambers, a unitary valve assembly positioned within the feed chamber and comprising a cage-structure having a hollow neck portion extending from one end and mounted in the passage, there being a valve-seat at the inner end of the hollow neck, a valve member housed in the cage and movable into or out of engagement with the valve seat, a valve-stem extending from the movable valve member through a guide-opening in the end of the cage remote from the neck, a guide-tube extending from the last-mentioned end of the cage, a head on the outer end portion of the stem and slidably guided in the tube, and a spring housed within the tube and confined between the last-mentioned end of the cage and the head of the stem and tending to move the valve away from the seat.

6. In a vapor regulator, in combination with a housing enclosing an inlet chamber and a feed chamber with a passage connecting the chambers, a unitary valve assembly positioned within the feed chamber and comprising a cage-structure having a hollow neck portion extending from one end and mounted in the passage, there being a valve-seat at the inner end of the hollow neck, a valve member housed in the cage and movable into or out of engagement with the valve seat, a valve-stem extending from the movable valve member through a guide-opening in the end of the cage remote from the neck, a guide-tube extending from the last-mentioned end of the cage, a head on the outer end portion of the stem and slidably guided in the tube, and a spring housed within the tube and confined between the last-mentioned end of the cage and the head of the stem and tending to move the valve away from the seat, an operating rod slidably guided in the end of the housing in line with the valve-stem, a sealing cup enclosing the ends of the head and tube with its closed end confined between the adjacent ends of the head and operating rod, and a flexible sealing bellows connecting the open end of the cup with the adjacent end of the housing.

7. In a vapor regulator, in combination with a housing enclosing a feed chamber having a steam inlet port and an outlet port, a valve-seat at the inner end of the inlet port, a valve member movable toward or from the valve-seat, an operating stem leading from the movable valve member through the end of the housing opposite the inlet port, a spring acting on the rod to move the valve away from the seat, means acting on the outer end of the rod to close the valve, and a flexible bellows diaphragm connecting an intermediate portion of the stem with the last mentioned end portion of the housing to seal this end of the housing, the increased pressure in the feed chamber when the valve is partially opened acting on the diaphragm to assist in completely opening the valve.

8. In a vapor regulator, a housing enclosing a return chamber having an inlet opening for receiving gases and condensate and a drain outlet in its lower portion, a sensitive bellows thermostat in the chamber comprising an end plate, a cup member having its bottom engaging the plate when the bellows is collapsed, a corrugated flexible bellows connecting the periphery of the plate with the open end of the cup so as to enclose the cup, a supporting stud extending from the outer face of the plate and secured to the adjacent end wall of the housing, a large annular stud projecting inwardly from the other end of the housing into the open end of the cup to guide the cup when the bellows is extended, an operating rod movable longitudinally through the annular stud and engaging the bottom of the cup at one end and extending outside the housing at the other end, and sealing means between the rod and housing.

9. In a vapor regulator, a housing enclosing a return chamber having an inlet opening for receiving gases and condensate and a drain outlet in its lower portion, a sensitive bellows thermostat in the chamber comprising an end plate, a cup member having its bottom engaging the plate when the bellows is collapsed, a corrugated flexible bellows connecting the periphery of the plate with the open end of the cup so as to enclose the cup, a supporting stud extending from the outer face of the plate and secured to the adjacent end wall of the housing, a large annular stud projecting inwardly from the other end of the housing into the open end of the cup to guide the cup when the bellows is extended, an operating rod movable longitudinally through the annular stud and engaging the bottom of the cup at one end and extending outside the housing at the other end, means carried by the housing for guiding the outer end portion of the rod, a collar on an intermediate portion of the rod, a flexible bellows sealing diaphragm connecting the collar and end wall of the housing, a shield mounted within the annular stud and enclosing the sealing diaphragm, a bearing for the inner end portion of the rod carried by the shield, and a spring confined about the rod between the collar and an end portion of the housing for collapsing the thermostatic bellows.

PAUL B. PARKS.
WILLIAM R. PETERSON.